Figure 1:
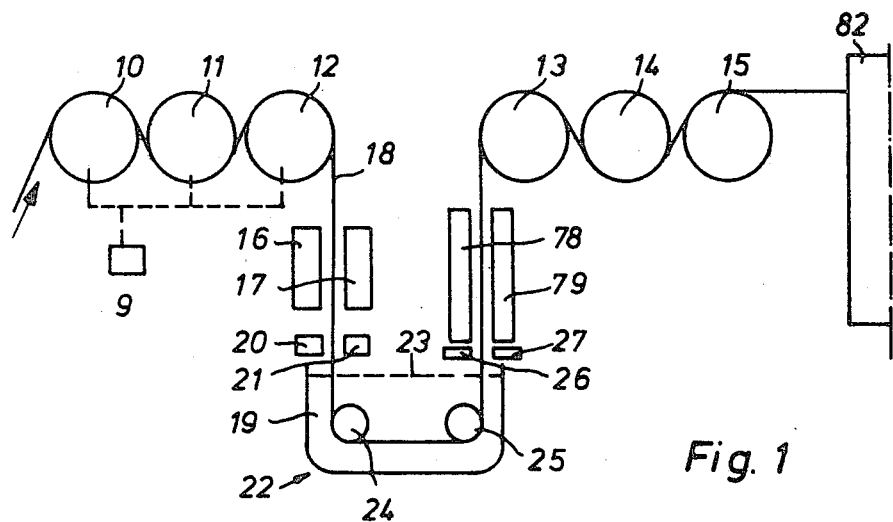

United States Patent [19]

Heirbaut et al.

[11] 4,293,508
[45] Oct. 6, 1981

[54] METHOD AND APPARATUS FOR LONGITUDINALLY STRETCHING A SUBSTANTIALLY AMORPHOUS POLYETHYLENE TEREPHTHALATE FILM

[75] Inventors: Wilfried A. Heirbaut, Haasdonk; Walter J. Rens, Kontich, both of Belgium

[73] Assignee: AGFA-GEVAERT N.V., Mortsel, Belgium

[21] Appl. No.: 139,558

[22] Filed: Apr. 11, 1980

[30] Foreign Application Priority Data

Apr. 11, 1979 [GB] United Kingdom ............... 12859/79

[51] Int. Cl.³ .................... B29C 17/02; B29D 9/00; B32B 27/06
[52] U.S. Cl. .................................. 264/25; 26/71; 26/106; 264/129; 264/134; 264/289.6; 427/55; 427/172
[58] Field of Search ............. 264/129, 134, 235.6, 264/235.8, 210.1, 210.7, 289.6, 290.2, 25; 26/71, 106; 427/55, 172

[56] References Cited

U.S. PATENT DOCUMENTS

| | | | |
|---|---|---|---|
| 3,444,585 | 5/1969 | Watanabe | 264/289.6 |
| 3,751,280 | 8/1973 | Nerurkar et al. | 264/129 |
| 3,786,127 | 1/1974 | Peet et al. | 264/288.4 |
| 3,816,886 | 6/1974 | Van Cappellen | 26/106 |
| 3,819,773 | 6/1974 | Pearl | 264/210.7 |
| 4,093,695 | 6/1978 | Heirbaut | 264/290.2 |

Primary Examiner—James B. Lowe
Attorney, Agent, or Firm—William J. Daniel

[57] ABSTRACT

A method and device for longitudinally stretching polymeric film, characterized by the strict isolation of the tensioning operation from the heating and the cooling operations of the film, by the symmetrical heating and cooling of the film, and by carrying out the heating of the film in two stages, namely preheating by means of diffused IR-radiation, and a full heating, preferably along a line, by means of bundled IR-radiation. The film stretched in this manner meets high standards of flatness and surface quality, and is subject to minimum waste losses and is especially useful in the photographic field.

24 Claims, 12 Drawing Figures

METHOD AND APPARATUS FOR LONGITUDINALLY STRETCHING A SUBSTANTIALLY AMORPHOUS POLYETHYLENE TEREPHTHALATE FILM

This invention relates to a process of longitudinally stretching a substantially amorphous polyethylene terephthalate film during its longitudinal conveyance by applying longitudinal stretching forces to the film by first and second traction means located at spaced positions along the path of conveyance of the film, while heating the film between said first and second traction means by means of infrared radiation to a temperature such that the film undergoes plastic elongation under said stretching forces, and cooling the stretched film. The invention also relates to apparatus for use in carrying out such process. The invention is of particular importance in the manufacture of film that will serve as a support for photographic film used for graphic purposes that must meet very high standards of quality.

In the extrusion process of making polymer film, the molten polymer is extruded through a slot-like orifice and the extruded polymer is received on a quenching drum or drums on which the temperature of the extruded film is lowered sufficiently rapidly through the softening range of the polymer to obtain a substantially amorphous film. By stretching the quenched film longitudinally and transversely while the polymer is at the lower end of the softening range, above the second order transition temperature of the polymer, the film can be subjected to molecular orientation leading to an improvement in various physical properties of the film, notably the tensile strength.

The longitudinal stretching of the film is usually achieved by passing the film first around a series of slowly rotating rollers and then around a series of rollers which are rotated more rapidly, and by heating the film between the two series of rollers to a temperature such that the film undergoes plastic elongation under the traction forces imposed on it due to the different speeds of the two series of rollers.

The heating of the film to the desired stretching temperature occurs in two stages in the conventional methods. In the first stage the film is heated to a temperature that is somewhat higher than the second order transition temperature (hereinafter called Tg) of the film. When stretching polyethylene terephthalate film for which Tg=69° C., said first stage heating usually heats the film to a temperature between 78° and 80° C. This first stage heating is effected by heating the first series of rollers. The first stage heating temperature should not exceed 82° C. because at temperatures higher than 82° C. the film starts to stick to the roller surfaces. In the second heating stage the film is heated to the stretching temperature by means of IR radiation. A common stretching temperature of the film is within the range 85° to 95° C.

The cooling of the film after stretching is effected by cooling the more rapidly rotating rollers to a temperature well below the Tg of the film but above the dew point of the atmosphere in order to avoid condensation effects.

This known process shows the following four important disadvantages.

Firstly the stretching span, that is the length of the film path over which the stretching occurs, is rather long and in consequence there is appreciable 'necking-in' of the film as a consequence of lateral contraction forces. This in turn gives rise to defects such as thickness variations in the transverse direction of the film, and the formation of beaded edges.

Beaded edges are the marginal portions of the film situated between the extreme edges of the film and the points where the thickness of the film starts to exceed the required predetermined thickness by more than the acceptable tolerance. Those edges must be trimmed before the film is wound-up and may contain quite an amount of film material. In some cases, the mentioned edge losses may amount to as much as 30%.

It is difficult to reduce the length of the stretching span because of the length of time required for the heating of the film to the stretching temperature by the IR radiation and the subsequent cooling of the film to a temperature below the softening temperature by contact with the cooled rollers. The stretching span required of course increases as film production rates increase. For instance, for a PET film of a thickness of 1.09 mm that has a speed of 12.1 m.min$^{-1}$ and that is longitudinally stretched to a stretch ratio of 3.3:1, the stretching span may amount to 102 mm.

Expressed in another way, the rate of stretch in that example is 58.764%.min$^{-1}$, when calculated according to the following equation:

$$R = \frac{(S - 1.0) \cdot L \cdot 100}{D}$$

wherein:
R is the rate of stretch in percent per minute
S is the stretch ratio
L is the average linear speed in m.min$^{-1}$ of the film during stretching, i.e. $(v_i+v_o)/2$ where $v_i$ is the input film speed and $v_o$ is the output film speed, and
D is the distance in meters over which the stretching takes place.

A second disadvantage is the tendency towards substantial unflatness of the longitudinally stretched film. This is thought to be due to the following phenomena. The alternate contact first of one and then the other film surface when the heated first series of rollers whereby corresponding alternating stresses tending transversely to curve the film are induced in it due to the differences in temperature which occur between the two sides of the film. Similar curving stresses are set up on cooling of the film by contact with the more rapidly rotating cooled rollers. The curving of the film inevitably involves non-uniform pressure of the film on the rollers and consequently a non-uniform heat transfer across the width of the film.

Moreover, uninterrupted longitudinal bands in the extruded and quenched film, that are almost unavoidable in practice and that are in fact zones of slightly increased thickness, are heated to a lesser extent by contact with the heated and more slowly rotating rollers than the other regions of the film and the non-uniformity of the film thickness becomes more pronounced upon longitudinal stretching so that internal stresses are created which further adversely affect the flatness of the film.

Substantial unflatness of the film may give rise to considerable production losses, for instance in the case of the production of graphic film, i.e. light-sensitive photographic material used for graphic reproduction purposes that must meet a high standard of flatness, and it may lead to complete interruptions of a production process in those cases where, prior to the heat relaxing of the film, one or more layers are coated on the film by means of one of the modern type coaters which are set close to the film, such as cascade or extrusion coaters. This is because the insufficient flatness of the film on passage through the coating station may cause rupturing of the coating bead or soiling of the lips of the coater owing to contact of the film with the coater.

A third disadvantage of the aforesaid known process is spoiling of the surface quality of the film due to its contact with the heated and cooled traction rollers while the film is under the stretching forces. When the film is wrapped about a portion of each roller the film is subjected to tension forces at its side remote from the roller and to compression forces at its side in contact with the roller, the disparity depending on the thickness of the film. At some level between the two surfaces of the film there is a "neutral" plane where the film is free from internal stress. As a consequence of the compression of the film at the roller side the corresponding film surface will be subjected to sliding friction, in addition to rolling friction. In spite of the roller surfaces being polished to a mirrorlike finish, they still have minuscule scratches and unevenesses. Sliding movement of the film over such surfaces causes longitudinal scratches on the film surfaces. While such defects are so small that they are concealed when the film base is subsequently provided with light-sensitive and other layers in the manufacture of photographic material, they are very objectionable in the case of film support to be sold in uncoated state to other users.

The problem above described is seriously aggravated by the thermal function of the stretching rollers since the heating and the cooling of the film by contact with the stretching rollers cause the neutral plane within the film to become displaced during such heating and cooling whereby the sliding friction of the film on the rollers is considerably increased. The displacement of said neutral plane is proportional to the film thickness, and for relatively thick film, that is film with a thickness greater than 2 mm, the problem is quite serious. A further point is that the friction coefficient of a polymer film with respect to a roller changes with the roller temperature, and above a given roller temperature said changes are rather important.

A fourth disadvantage is the soiling of the heated, slowly rotating stretching rollers by the deposition thereon of oligomers. It has been shown that the deposition of oligomers increases with the temperature of said rollers. The oligomer deposition causes streaklike defects that are visible on the stretched film as longitudinal bands of reduced transparency.

It has been proposed to overcome a number of problems, by carrying out the cooling of the film by conducting the film into a bath with cooling liquid. In this way the cooling of the film could proceed more rapidly whereby the stretching span could be shortened, the cooling could occur symmetrically, and sliding friction between the film and rollers with a thermal (cooling) function, could be avoided. However, it has been shown that under common stretching conditions it is impossible to obtain an undisturbed contact of the film with the cooling liquid. On the contrary, the film in tensioned condition is struck by the cooling liquid like a string, and starts to vibrate whereby the surfaces of the softened film are intolerably damaged for photographic purposes.

It is the aim of the present invention to provide a process and an apparatus for longitudinally stretching polyethylene terephthalate film which in comparison with the known process and apparatus enables film to be longitudinally stretched during high speed production with less edge loss and while achieving stretched film of high standards of flatness and surface quality.

In certain embodiments of the invention the longitudinal stretching of the film is combined with a film coating step in a way which is economically attractive and is conductive to strong coating adherence to the film substrate.

In accordance with the present invention, a process of longitudinally stretching a substantially amorphous polyethylene terephthalate film during its longitudinal conveyance by applying longitudinal stretching forces to the film by first and second traction means located at spaced positions along the path of conveyance of the film, while heating the film between said first and second traction means by means of infrared radiation to a temperature such that the film undergoes plastic elongation under said stretching forces, and cooling the stretched film, is characterised in that the temperature of the first traction means is not higher than 65° C., that the heating is achieved by directly and symmetrically exposing both sides of the film first to diffused IR-radiation to increase the film temperature but not sufficient for plastic elongation to occur thereby preheating the film, and then to concentrated infrared radiation to heat the film to a temperature between 100° and 120° C. whereby rapid plastic elongation of the film occurs under said stretching forces, and that the film is rapidly cooled to below its second order transition temperature, before it reaches the second traction means, by bringing the two sides of the film symmetrically into contact with a cooling liquid.

The term "amorphous" denotes that the polymer film has a crystallinity less than 1%.

The term "symmetrically" indicates that a given zone of the film is subjected at both its sides at approximately the same time to approximately the same rate of heating or cooling.

The term "diffused" IR-radiation stands for unconcentrated IR-radiation that covers an area on the film with a substantial width, i.e. a distance measured parallel with the distance of movement of the film, greater than 10 cm.

The term "concentrated" infrared radiation points to radiation having a much more intense heating effect on the film than the effect of the diffused infrared radiation. Such increased effect may be obtained by using the following features, either separately or in combination. The concentrated infrared radiation occurs at a wavelength for which the film shows a better absorption than for the wavelength of the diffused infrared radiation. The radiators used for the concentrated radiation may have a higher power output per unit of length than the radiators used for the diffused radiation. The concentrated radiation may be bundled, e.g. by means of appropriate reflectors, to increase the energy input per surface unit of the film.

The area of the film where the film is subjected to concentrated radiation is a zone that extends transversely of the film and that has a width, that is preferably smaller than 100 mm. Even more preferably, the length i.e. measured in the direction of movement of the film, of said zone of concentrated infrared radiation is comprised between 1.0 and 5.0 mm and for convenience, the heating at suchlike narrow zone is hereinafter referred to as "line heating".

Preferably, the method according to the invention is carried out so that the temperature of the first traction means is lower than 55° C.

It has been found that at temperatures higher than 55° C. there occurs a gradual soiling of the traction means by the deposition thereon of oligomers, and a temperature of 65° C. is considered an operational upper limit.

Still more preferably, the average temperature gradient caused across the thickness of the film by said traction means is less than 0.2° C. per 0.1 mm of film thickness.

The term "average" points to the temperature gradient with a moderate slope that is caused over the greatest portion of the film thickness, as will be further explained in the description of the specification. The following formula expresses said gradient gr:

$$gr = \frac{1}{d} \int_0^d t(x) \cdot dx$$

wherein:
d is the thickness of the film, and
t(x) is the temperature at a given point within the film at a distance x from the outer film surface.

The first traction means may be at a temperature between 20° C. and 40° C. in case the film is coated with a layer prior to the longitudinal stretching.

Since the film may run out of contact with any film supporting means during the preheating, line heating, stretching and cooling steps, the film may be coated on one or both sides with a layer of a liquid coating composition, and the heating that is used for the stretching of the film may serve for the drying of such layer or layers before the latter enter into contact with the cooling liquid. Said layer may be for instance a subbing layer or a primer layer for the film base, and the great advantage of the coating of a suchlike layer before the longitudinal stretching is that its thickness may be as many times greater than the longitudinal stretch ratio since the longitudinal stretching reduces the thickness of the layer correspondingly. Thus it is possible in a number of cases to coat suchlike layer by means of otherwise obsolete coating systems that have a limited coating speed, but that have the advantages of simplicity of operation, and easy maintenance and adjustability, compared with modern coating systems such as cascade or extrusion coating. A still further advantage is that the adhesion of layers to the film support may be improved by the stretching of the film support. Such layer compositions usually are best coated at temperatures between 20° and 40° C. and it is for that reason that the film temperature, produced by the first traction means, should be within the specified temperature range.

The important advantages of longitudinally stretching the film at a temperature within the range of 100° to 120° C., in comparison with the usual stretching at temperatures between 85° and 95° C., are as follows.

The stretching of the film at higher temperatures occurs more homogeneously whereby a better film quality is obtained.

The modulus of elasticity of the film at stretching temperatures within the claimed range is sufficiently less than the modulus of elasticity at 85° to 95° C., to avoid vibration of the film under the influence of the longitudinal tensioning forces. In other words, it may be considered that the stretching of the film between 100° and 120° C. causes precisely that damping of the film that is required in order to satisfactorily liquid cool the film.

The longitudinal stretching of polyethylene terephthalate film at temperatures higher than 100° C., and the cooling of the film by means of common cooling rollers does not produce film of acceptable photographic quality, since slipping of the highly softened film on the cooling rollers seriously reduces the surface quality of the film. Further, the limited heat transfer by the cooling rollers causes the stretching span to become longer than desired, whereby necking-in and edgelosses increase.

The mentioned lower limit of 100° C. is a temperature below which the elasticity of the film no longer permits a sufficient damping of film vibrations. The upper limit of 120° C. is a temperature above which disorientation of the oriented film molecules becomes too serious to be accepted. A preferred temperature range for the stretching of the film in accordance with the present invention, is from 105° to 115° C.

The temperature of pre-heating of the film is suitably situated within the range of 75° to 80° C.

The process according to the invention can be employed for achieving a wide range of stretch ratios, e.g. ratios from 2.5:1 to 4.0:1.

According to the present invention there is also provided an apparatus for the longitudinal stretching of a substantially amorphous polyethylene terephthalate film. Such device comprises:
first driven roller means for feeding said film at a first speed in a zone where the film is freely supported,
means for controlling the temperature of said first roller means lower than 65° C.,
first IR-heaters disposed symmetrically at both sides of the film path through said zone producing diffused IR-radiation to pre-heat the film to a temperature at which it does not yet become stretched,
second IR-heaters disposed transversely and symmetrically at both sides of the film path, for heating the film to a temperature between 100° and 120° C.,
a bath with cooling liquid into which the heated stretched film is immersed,
means in said bath for keeping the free surface of said cooling liquid at the entry region of the film quiescent,
roller means disposed below the level of the cooling liquid in said bath for terminating the zone where the film is freely supported, and
second driven roller means for pulling the cooled film at a second speed that is higher than said first speed.

The position of the second IR-heaters is suitably adjustable so that the position of a transverse line on which the film is heated to the stretching temperature may be adjusted between the outlet end of said IR-heaters and the level of the cooling liquid in said bath.

The friction between the film and the roller means disposed below the level of the cooling liquid in the bath for terminating the zone where the film is freely supported, is preferably at least equal to the friction between the film and the said first driven roller means. This is related to the phenomenon which will be called hereinafter "slip-stick". If the film is brought under tension by a roller rotating at a speed differing from the speed of the film, then at a given moment the film will start to slightly slip on the roller surface until at a given moment the friction has increased again to such an extent that the film literally "sticks" to the roller surface and is pulled again by the roller without any slip at all. Immediately thereupon the same phenomenon is repeated since the film starts again to slip, then to stick to the roller surface, and so on. It has now been found that the surface quality of the film is improved if the friction between the film and the roller means disposed below the level of the cooling liquid, equals the friction between the film and the first driven roller means. This means in practice that the friction coefficient with respect to the film of the roller means disposed below the level of the cooling liquid if measured in dry condition, must be greater than the friction coefficient of the first driven roller means. One way for increasing the friction of the immersed roller means is to increase its surface roughness by polishing to a less degree than the surfaces of the first driven roller means. Another way is the choice of a material, for the said roller surfaces other than the usual stainless steel, that shows as increased friction coefficient versus the film when wetted by the cooling liquid.

The bath with cooling liquid preferably shows the following features.

It comprises two parallel overflow edges that are situated at either side of the entry plane of the film into the cooling liquid, and that have a saw-tooth profile. The rate at which cooling liquid is pumped into the bath is such that the level of the liquid in the entry zone of the bath between the two parallel overflow edges is situated between the upper half of the height of the teeth of the overflow edges and, still more preferably, is situated near or at the tops of said teeth.

The first IR-heaters may be mounted within an IR reflecting casing at either side of the film path, each casing being arranged for cooling thereof by a forced current of air, and for directing at least a portion of the air which has been heated by convection of the IR-radiators onto both sides of the film.

The device may advantageously comprise coating means for applying a layer from a coating composition to at least one side of the film at a position situated between the first driven roller means and the first IR-heaters.

Figure 2:
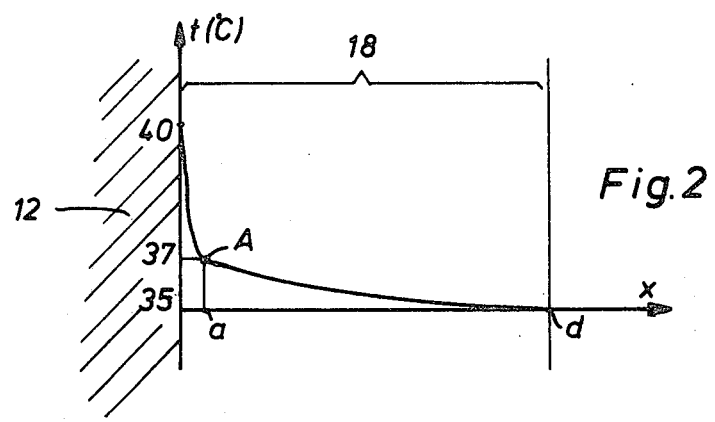
Figure 3:
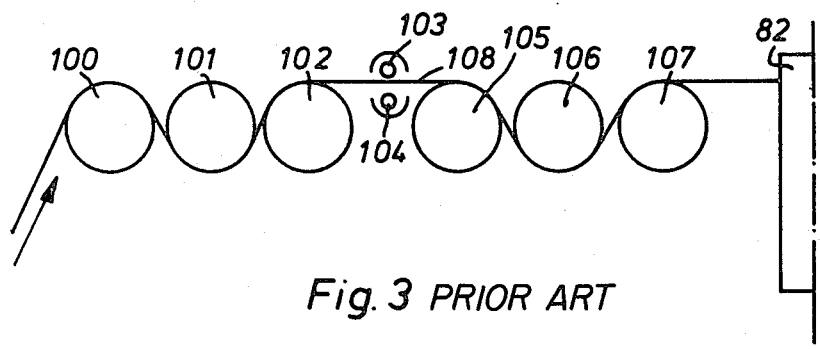
Figure 4:
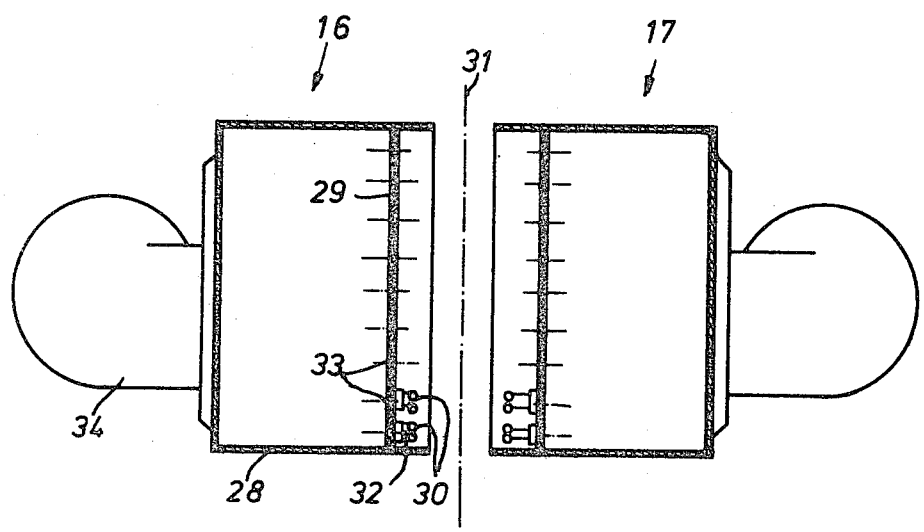
Figure 5:
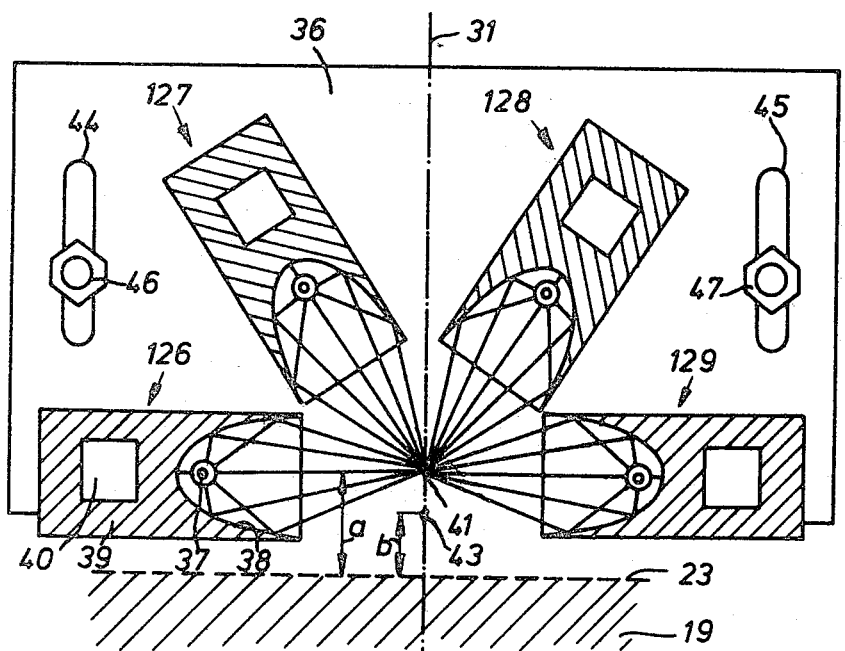
Figure 6:
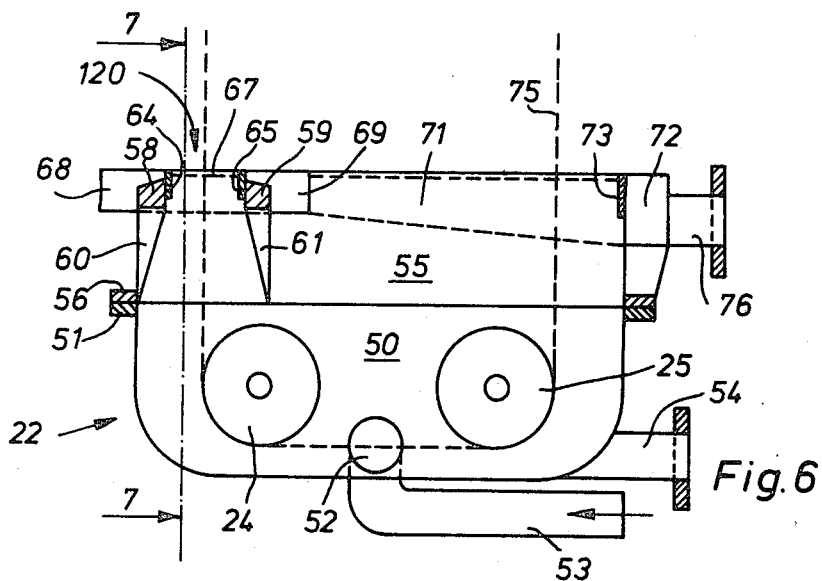
Figure 7:
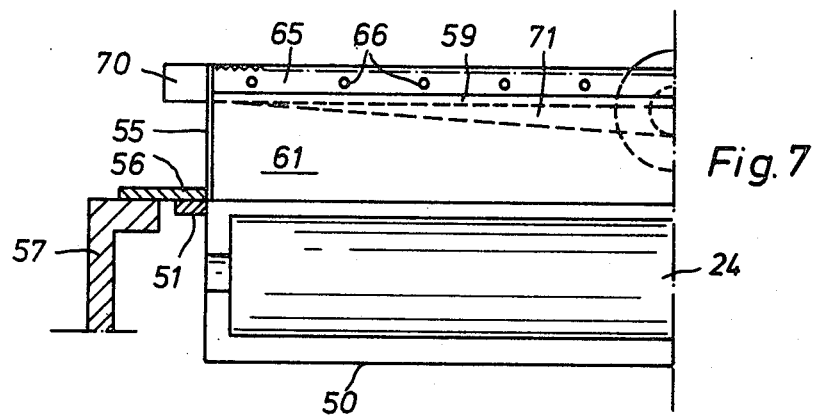
Figure 8:
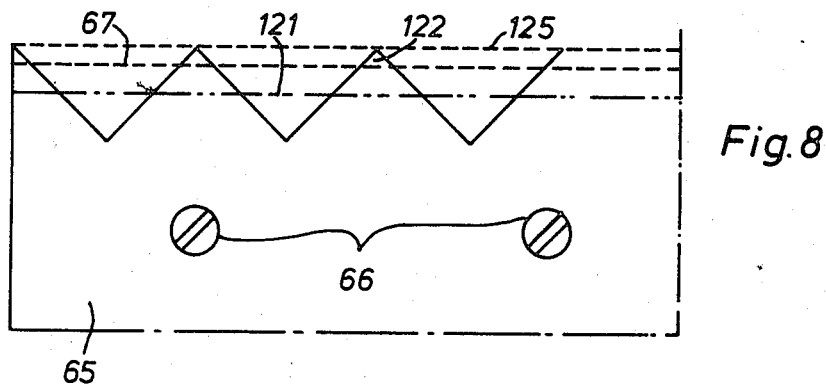
Figure 9:
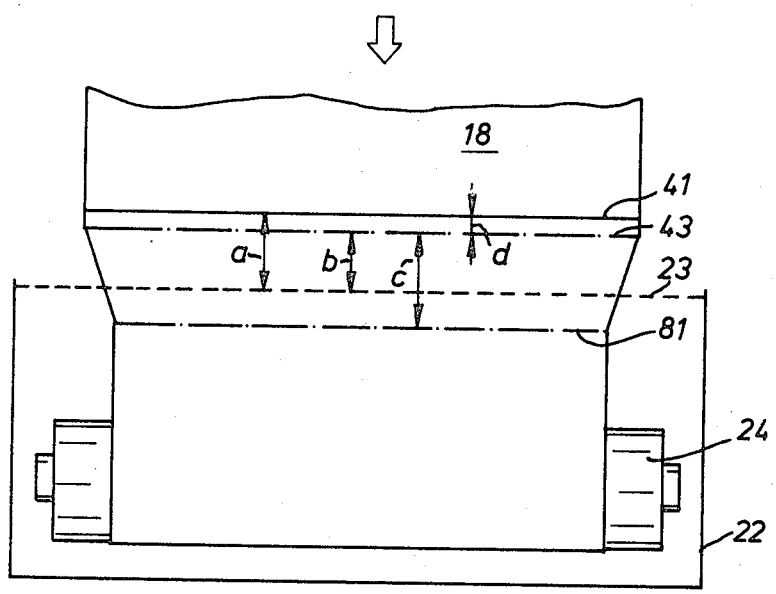
Figure 10:
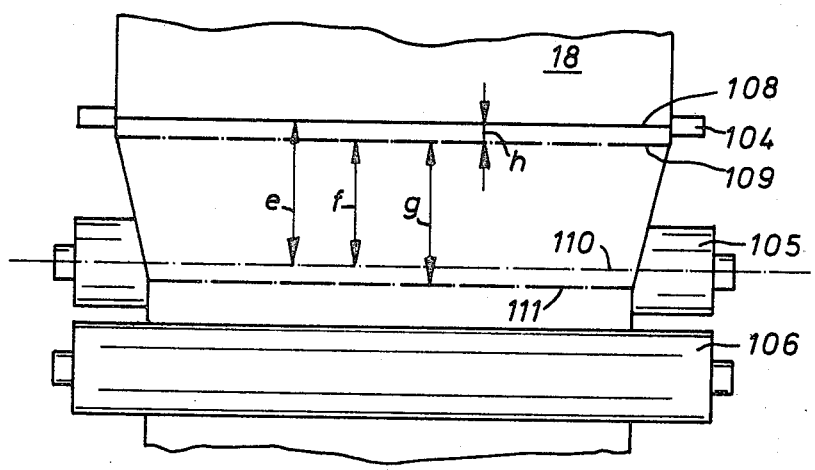
Figure 11:
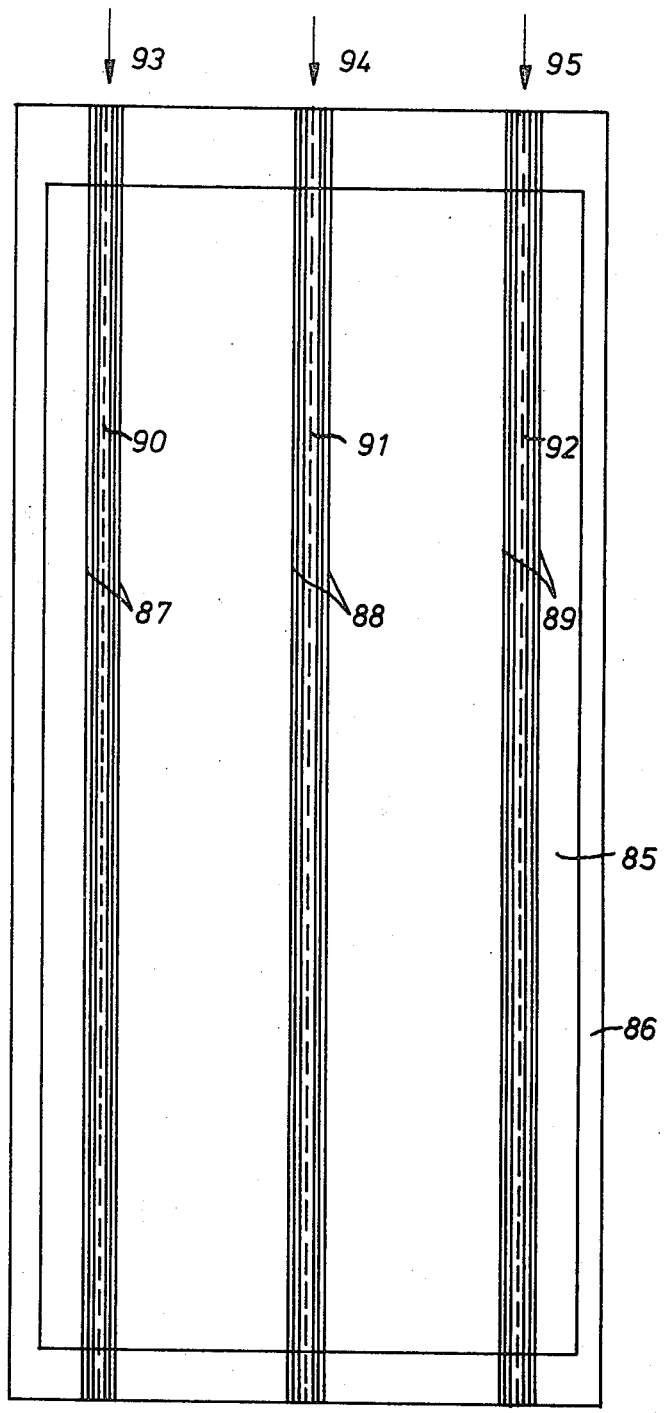
Figure 12:
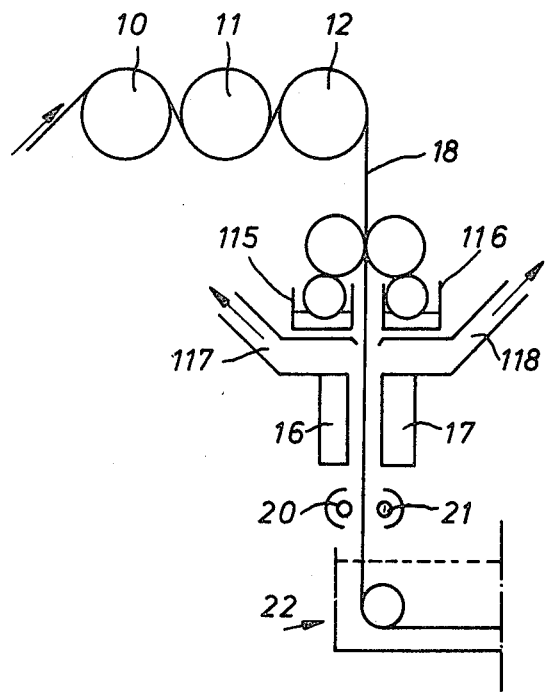

The invention will be described hereinafter by way of example with reference to the accompanying drawings wherein:

FIG. 1 is a diagrammatic view of one embodiment of an apparatus for longitudinally stretching a film in accordance with the invention, FIG. 2 is a diagram illustrating the temperature gradient through the film thickness, FIG. 3 is a diagrammatic view of a prior art longitudinal stretching apparatus, FIG. 4 is a view in detail of the first IR-heaters of the apparatus according to FIG. 1, FIG. 5 is a view in detail of the second IR-heaters of the apparatus according to FIG. 1, FIG. 6 is a view in detail of the cooling station, FIG. 7 is a sectional view on line 7—7 of FIG. 6, FIG. 8 is a view in detail of a saw-tooth profiled overflow edge of the cooling station, FIG. 9 is a plan view of a film at the position where it is being stretched and is necked-in in the apparatus according to FIG. 1, FIG. 10 is a plan view of a film at the position where it is being stretched and is necked-in in the apparatus according to FIG. 3, FIG. 11 is a diagrammatic view, illustrating the measurement of the flatness of a strip of film, and FIG. 12 is a diagrammatic view of the embodiment of FIG. 1, arranged however for coating a layer on each side of the film prior to the stretching of the film.

Referring to the embodiment illustrated in FIG. 1, an apparatus for longitudinally stretching a polymer film in accordance with the invention comprises a series of three rollers 10, 11, and 12 driven by suitable means known in the art at a first speed $v_i$, and three rollers 13, 14, and 15 driven at a second speed $v_o$, the quotient of $v_o$ by $v_i$ determining the stretching ratio of the film.

The rollers 10 to 15 may be steel rollers having a highly polished mirrorlike surface finish as known in the art.

The temperature of the rollers 10 to 12 is controlled by heat exchanger means 9 in such a way that the temperature of said rollers is lower than 65° C.

The function of the two series of rollers is to produce in the film web portion that extends between them, a longitudinal tensioning force that is sufficient to effect longitudinal stretching of the film when the film has been heated to the stretching temperature.

The rollers have no real thermal function in the film stretching process. This means that in principle the temperature of the rollers is equal to the temperature of the film entering into contact with them. It should be understood, however, that in practice small differences may exist between the temperature of the film and a roller contacted thereby, and for the purpose of the present invention we consider that a temperature difference is tolerable when it does not create an average temperature gradient in the film exceeding 0.2° C. per 0.1 mm of the thickness of the film. This notion "average temperature gradient" is illustrated in the diagram of FIG. 2 wherein the abscissa x represents the thickness d of the film 18, and the ordinate t is a temperature axis. The hatched portion is the portion of the roller 12 in contact with the film. The steep portion of the temperature curve is explained by the poor thermal conductivity of the film so that contact of the film with the roller surface at a temperature different from that of the film, will give the illustrated temperature plot. If, for instance, the temperature of the roller surface is 40° C. and the temperature of the film is 35° C., the temperature of the film at point A will be about 37° C., the distance a being only about 10 μm. The further temperature decrease from 37° to 35° C. occurs over practically the complete film thickness d, and it is this decrease that is substantially determinant for the average temperature gradient, in accordance with the formula given in the introduction of the specification. In the present example, it may be seen that $gr = (37°-35° C.)/d$.

The preheating of the film occurs by first IR-heaters 16 and 17 disposed symmetrically at both sides of the path of the film 18. The heating of the film to the stretching temperature occurs by second IR-heaters 20 and 21 disposed symmetrically on both sides of the path of the film.

The cooling of the stretched film occurs by conveying the film into a body of cooling liquid 19 contained in a station 22. The level of the liquid is indicated by the dotted line 23.

The guidance of the film through the cooling station occurs by freely rotatable rollers 24 and 25 immersed in the cooling liquid. The drying of the cooled film as it is conveyed towards the film pull rollers 13 to 15 occurs by means of squeeze means 26 and 27, and heaters 78 and 79.

The rollers 24 and 25 may have a surface finishing that is slightly rougher than that of the rollers 10 to 12, thereby to provide a friction coefficient for the film, while they are immersed in the liquid 19, that is nearly as high as the friction coefficient between the film and the rollers 10 to 12.

The heating and cooling means illustrated diagrammatically in FIG. 1, are shown more detailed in FIGS. 4 to 8.

Referring to FIG. 4, the first IR heaters 16 and 17 for achieving the diffuse pre-heating comprise each a rectangular metal casing 28, the side of which facing the film path is completely open (only the left hand side heater 16 has been numbered). The casing 28 is provided with a wall 29 running parallel with the opening and spaced inwardly a distance of approximately 5 cm therefrom. The wall 29 is provided with 9 IR-rodlike twin-filament quartz lamps 30, only two of which have been illustrated. The lamps are located transversely with respect to the path 31 of the film, and are mounted with their extremities in supports 32 for electrical connection. The wall 29 is provided with 9 slots 33 that run parallel with each lamp, and through which cooling air which is produced by a blower 34, is blown along the lamps and onto the film. The air heated by the lamps supplements in consequence the preheating of the film by the IR-radiation. The heating of the film by the IR-heaters 16 and 17 is done to such an extent that the film does not yet start to stretch upon leaving the heating zone between said heaters. This does not mean that the film may not be subjected to a slight elongation, up to 1%, but such an elongation is an elastic deformation, as distinct from plastic deformation that occurs if the film, under the same longitudinal tensioning force, is heated to its stretching temperature.

Referring to FIG. 5, the second IR-heaters 20 and 21 may comprise each two radiators such as 126, 127 and 128, 129 mounted between lateral supporting plates such as the plate 36. The radiator 126 and similarly the three other radiators, comprise a rodlike IR-radiator lamp 37 mounted in one focus of an elongated ellipsoidal reflector 38 that is formed in a solid block 39 of metal provided with a duct 40 for cooling water flow.

The second focal line of the reflector 38, as indicated by the point 41, is situated on the path 31 followed by the film, and so are the second focal lines of the three other radiators 127, 128 and 129.

The distance between the line 41 and the level 23 of the cooling liquid is indicated by a, whereas the distance between the transverse line 43 where the film starts actually to stretch and the level of the cooling liquid is indicated by b. The two lateral plates, such as the plate 36, that support the radiators are arranged for vertical adjustment, as illustrated by the slots 44, 45 and the corresponding lock nuts 46, 47 so that the vertical position of the line of radiant energy 41 on the film with respect to the level 23 of the cooling liquid may be altered.

The cooling station 22 of the apparatus is illustrated in detail in FIGS. 6 to 8. It comprises an elongated tub 50 of stainless steel plate which is fitted to a horizontal frame 51. The tub 50 is provided at both sides with an inlet such as the opening 52 shown, through which cooling liquid may be pumped through a conduit 53 into the tub. The tub is further provided with a discharge conduit 54 which may be coupled by means of a flange to a suitable valve for emptying the tub as maintenance or inspection is required. Rollers 24 and 25 are mounted in parallel for free rotation in the station.

The upper part 55 of the cooling station is formed by a rectangular construction of stainless steel plate that is fitted by a frame 56 at its underside to the frame 51 of the tub 50. The lateral sides of the frame 56 have protruding extensions that rest on vertical supports such as the support 57 shown in FIG. 7, for supporting the cooling station.

The upper part 55 comprises two square beams 58 and 59 that extend between the two lateral walls of said upper part. Two platelike triangular constructions 60 and 61 that are fitted to the lower sides of the beams define therebetween a convergent channel for the cooling liquid to the inlet opening 120 of the station. The mutually facing sides of the beams 58 and 59 are provided with toothed stainless steel laths 64 and 65 that are fitted with screws 66 to the corresponding beam as shown in FIG. 7.

The liquid pumped upwardly through the converging entrance channel flows on the line 67 through said teeth into the gutters 68 and 69. Said gutters communicate at one lateral side of the apparatus with the gutter 70, see FIG. 7, which is drained via a slanting conduit 71 into another gutter 72 which runs parallel with the gutters 68 and 69. The gutter 72 has a toothed ledge 73 mounted at the same height as the ledges 64 and 65, and serves the purpose of avoiding stagnation of the liquid in the cooling station between the vertical film path 75 and the adjacent wall of the cooling station.

The level 67 of the liquid in the inlet opening 120 of the station may be situated within the upper half of the height 121 of the teeth 122 as illustrated in detail in FIG. 8. This level 67 is determined by the configuration of the converging channel which is formed by the opposed slanting walls of the constructions 60 and 61 which accelerate the flow of liquid in the upward direction, and the rate at which the liquid is fed into the bath through the conduit 52.

It has been shown that said level 67 may preferably be situated near the tops of teeth 122, as shown by the broken line 125. It was experienced that such liquid level was most favourable for avoiding disturbances of the liquid surface between the two laths 64 and 65. As a matter of fact, it was shown that standing wave patterns and other disturbances of the liquid that were caused by the movement of the film through the liquid mass were entirely confined to the surface of the liquid in the gutters 68 and 69 whereas the surface of the liquid between the gutters, that is between the laths 64 and 65, was almost immobile.

The liquid that is collected in the different gutters is drained through a conduit 76 provided with a flange for connection to a suitable vessel wherein the temperature of the cooling liquid is controlled prior to the recirculation thereof to the inlet conduit 53. Means is provided, not shown, for replenishing the liquid that has been carried along by the film leaving the cooling station.

Finally, the drying of the liquid-cooled film occurs by means of squeezing means 26, 27, and by heaters 78 and 79. The squeezing means may be formed by strips of soft rubber that are at either film side in squeezing contact with the film surface thereby to uniformly squeeze off the greatest portion of the liquid that adheres to the film. Alternative squeeze means for removing most of the liquid that adheres to the film may be formed by two so-called air knives mounted on both sides of the film path for blowing downwardly a substantial portion of the liquid that has been taken up by the film from the cooling station.

The heaters 78 and 79 may be formed by a set of IR-lamps and a blower, similar to the first set of IR-heaters described hereinbefore for preheating the film, but they may also be formed by so-called flat-driers, known in the art, comprising a metal wall running parallel with the film path at each side thereof at a distance of some centimeters, and provided with a plurality of transverse slots with a width of some millimeters through which heated air is blown onto the film surface. Air laden with moisture escapes at the lateral sides of the film.

The improved longitudinal film stretching which may be carried out according to the present invention is demonstrated hereinafter by two examples, one pertaining to the stretching by means of the apparatus according to FIG. 1, the other pertaining to the stretching by means of a prior art device illustrated in FIG. 3.

EXAMPLE 1

A polyethylene terephthalate polymer having an inherent viscosity of 0.57 dl.g$^{-1}$ was extruded at a rate of 730 kg.h$^{-1}$ and at a temperature of 290° C. through a conventional elongate extrusion die having an orifice measuring 2.3×670 mm. The molten polymer was received on quenching drums which were driven at a rate of 12.72 m.min$^{-1}$. The film temperature amounted to 37° C. as the film left the last quenching drum, and the amorphous film had a crystallinity of 0.4%. The film was fed to the rollers 10, 11, 12 which were driven at a rate of 12.7 m.min$^{-1}$ and were maintained at a surface temperature of 40° C.

The first set of IR-heaters 16 and 17 each comprises 10 parallelly spaced IR-lamps of the type "middle-wavelength", consuming each an electrical power of 50 Watts/linear cm. The maximum of the emission spectrum of the lamps was situated at approximately 2 μm. The length of the heaters 16 and 17, measured parallel with the direction of film movement, amounted to 25 cm. The temperature of the film leaving the heaters 16 and 17 amounted to 79° C.

The second set of IR-heaters 126 to 129 each comprised one IR-lamp of the type "short-wavelength", and consuming each a power of 80 Watts/linear cm. The maximum of the emission spectrum of the lamps was situated at 1.2 μm. The distance a (FIGS. 5 and 9) between the line 41 onto which the radiant energy was focussed on the film, and the level 23 of the cooling liquid, amounted to 20 mm. The distance b between the line 43 (see FIG. 9) where the stretching of the film 18 started, and the level 23 of the cooling liquid amounted to 15 mm. The distance d between lines 41 and 43 is explained by the fact that, although the film received at the position of the line 41 the maximum energy to become heated to the stretching temperature, said stretching temperature is reached only with some delay caused by the dispersion of the heat throughout the thickness of the film. The temperature of the film on the line 43 amounted to 110° C. and was measured by means of a Barnes radiation pyrometer.

The width of the film measured on the line 43 was 664 mm.

The stretch ratio of the film was 3.3:1 since the rollers 13 to 15 were driven at a speed of 41.9 m/min$^{-1}$. The corresponding stretch rate amounted to 330,000% min$^{-1}$.

The stretching and the necking-in of the film did not stop on the line 23 but continued to the line 81 situated below the level of the cooling liquid (see FIG. 9). The distance c amounted to 35 mm. The width of the film measured on the line 23 was 634 mm whereas the width on line 81 was 615 mm.

The stretched film was pulled through the cooling station that contained demineralized water as a cooling medium. The water was kept at a temperature of 16° C. The squeeze means 26 and 27 were air knives, and the heaters 78 and 79 comprised parallelly spaced IR-lamps over which cooling air was blown.

The dried film had a surface temperature of 50° C., measured by means of a Barnes pyrometer, as it contacted the pull roller 13. The rollers 13, 14 and 15 were kept at a temperature of 35° C. and conveyed the film to a conventional apparatus 82 for transversely stretching the film to a ratio of 3.3:1, while the film was at a temperature of 100° C. The biaxially stretched film was then heat-set at a temperature of 205° C. for 1.5 s.

The beaded edges of the heat-set film were trimmed, the margins of the film were knurled and then the film was wound up.

The edge loss caused by the trimming of the beaded edges of the heat-set film amounted to 17% by weight. The net film width after the trimming of the beaded edges amounted to 173 cm, and the thickness variations measured across the width of the film were smaller than 1.5%.

At both sides the film surface was completely free from any scratches, streaks, or the like. The film margins were completely free of any curling tendency so that no difficulty was encountered with the gripping of the margins of the longitudinally stretched film by the clamps of the stretcher 82 for the transverse stretching of the film (see FIG. 1).

The flatness of the film was very good, represented by quotations (as hereafter explained) 1, 1, and 1 for the left, the central and the right region of the film, respectively.

The measurement of the flatness of the film occurred as follows. A film strip 85, see FIG. 11, in the present case a strip of a length of about 5 meters, was cut from the wound up material and put on a horizontal flat table 86. The table 86 has a white smooth top surface which is provided with three groups 87, 88 and 89 each having ten equally spaced black lines (ten lines per group) only some of which have been illustrated in the figure. The lines of each group are spaced from each other by about 1 cm. The group of lines 88 is drawn centrally of the table whereas the lateral position of the groups 87 and 89 is such that they are situated at a distance of approximately 20 cm from the corresponding film edges. Above the table and running parallel therewith, there are provided three elongate light sources (not illustrated) that are partially masked so that each of them produces a line of light of a width of about 5 mm.

The projected lines of light on the table are illustrated by the broken lines 90, 91 and 92. The table is further provided with a plurality of small bores (not illustrated) so that a length of film which is laid on the table may readily assume a more or less flat position after the air has escaped from its lower surface. If now an inspector looks onto the film at three positions indicated by the arrows 93, 94 and 95, then he will notice that the projected lines of light 90, 91 and 92 are no longer running straight but, on the contrary, will show a capricious course, which is determined by the distortion of the images of the line light sources in dependence on the lack of flatness of the film. The results of this observation are graded simply in terms of the number of lines of each group that are counted by the inspector between the peak to peak deviations of the corresponding projected line of light.

Finally, the adhesion of a conventional type of subbing layer that was coated on the film prior to the longitudinal stretching thereof, see also FIG. 12 and the corresponding description, was excellent, represented by quotation 1.

The measurement of the adhesion of a subbing layer to the film occurred as follows. A film sample with a subbing layer was subjected to a scratch test that was carried out in the following way. A bar with a row of steel needles was pulled over the subbing layer in two perpendicularly crossing directions. The pressure on the bar was so adjusted that the needles just penetrated through the subbing layer. Then a strip of self-adhesive tape was applied to the scratched layer and withdrawn therefrom. Dependent on the quality of adhesion of the layer to the film sample, not any or a considerable number of the many corner portions of the subbing layer at the points of intersection of the perpendicular scratch lines, was or were pulled off by the tape.

A grade of 1 stands for a number of removed corner particles equal to zero whereas the grade 4 stands for a number of removed particles that is so high that the quality of adhesion is unacceptable for a film to be used in the manufacturing of photographic light-sensitive material.

EXAMPLE 2 (COMPARATIVE)

A polyethylene terephthalate polymer having an inherent viscosity of 0.57 $dl.g^{-1}$ was extruded at a rate of 864 $kg.h^{-1}$ and at a temperature of 290° C. through a conventional elongate extrusion die having an orifice measuring 2.3×670 mm. The molten film was received on quenching drums which were driven at a rate of 12.72 $m.min^{-1}$. The film temperature amounted to 38° C. as the film left the last quenching drum, and the amorphous film had a crystallinity of 0.3%.

The film was fed to the rollers 100, 101 and 102 of the conventional longitudinal stretcher illustrated in FIG. 3. Said rollers are driven at a rate of 12.7 $m.min^{-1}$ and were heated to a temperature of 80° C. The radiant heaters 103 and 104 comprised each 5 parallel IR-lamps of the type "short-wavelength", consuming each an electrical power of 80 Watts/linear cm. The maximum of the emission spectrum of the lamps was situated at a wavelength of 1.2 μm. The heating temperature of the film due to the heaters 103 and 104 amounted to 105° C. The stretched film was cooled by the rollers 105, 106, and 107 which were driven at a rate of 41.9 $m/min^{-1}$ and were kept at a temperature of 20° C. The longitudinally stretched film was further stretched transversely and heat-set as described hereinbefore with reference to Example 1.

The stretching and the necking-in of the film are illustrated in detail in FIG. 10 in which 108 is the projection of the exit end of the radiation sources on the film, 109 is the line where the stretching and the necking-in of the film start, 110 is the line of first contact of the film with the cooling roller 105, and 111 is the line on the film at which the necking-in as well as the stretching of the film are arrested. The stretching and the necking-in distance is thus the distance g between the lines 109 and 111, and can be compared with the distance c of FIG. 9.

The different parameters were as follows:
Stretch ratio: 3.3:1
Stretch rate: 62.905%.$min^{-1}$
e: 9.5 cm
f: 9 cm
g: 10 cm
h: 0.5 cm
Width of the film measured on line 109: 664 mm
Width of the film measured on line 111: 561 mm The longitudinally stretched film was fed to a conventional transverse stretcher corresponding with 82 in FIG. 1, where the film was stretched to a ratio of 3.3:1 while the film was at a temperature of 100° C. The biaxially stretched film was finally heat-set at a temperature of 205° C. for 1.5 s. The beaded edges of the film were trimmed, the margins of the film were knurled and the film was wound up. The edge loss caused by the trimming of the beaded edges of the film amounted to 30%.

The net film width after the trimming of the beaded edges amounted to 1730 mm, and the thickness variations measured across the width of the film amounted to 3%.

The relative important edge loss is caused by the increased necking-in of the film and by the more pear-like cross-sectional profile of the beaded edges whereby their thickness decreases more slowly towards the centre of the film up to the point of 2.5% thickness variation, than do the beaded edges of the film produced according to the foregoing example wherein the beaded edges have a more circular cross-section.

Each film side face showed a plurality of subtle scratches running in the longitudinal direction of the film and having a length varying between 0.1 and 1.5 mm. The film margins of the longitudinally stretched film showed a small tendency to fluting whereby sometimes difficulties were met with the gripping of the film margins by the clamps of the transverse stretching apparatus 82.

The film flatness is graded as 3, 2 and 3 for the left, the central and the right region measured as described hereinbefore.

Finally, a subbing layer equal to the one used in Example 1 but that was coated after the longitudinal stretching of the film (as in conventional practice) instead of before the longitudinal stretching, showed adhesion represented by grades ranging from 2 to 3. It was further found that the transparency and the brightness of said subbing layer, judged merely visually, were notably less than the transparency and the brightness of the layer coated in accordance with Example 1. It is believed that the less good adherence must be explained by the fact that a longitudinally stretched, and thus molecularly oriented, film is more crystalline than is a non-stretched film. An amorphous film is easily affected by a foreign body and thereby offers the best adhesion for a layer coated thereon. As the film becomes more crystalline, its receptivity, and in particular its adhesion for a layer coated thereon, decrease.

It is thus clear that the film produced in accordance with the present invention is on all the concerned points superior to the film produced on a conventional stretching apparatus.

FIG. 12 illustrates diagrammatically the device of FIG. 1, arranged however for the simultaneous coating of two subbing layers, one on each side of the film.

As may be seen, the arrangement may comprise a pair of two-roller coaters 115, 116 that are mounted for applying liquid compositions from corresponding trays on both sides of the film. Additional channels 117 and 118 may be provided for evacuating the heated air and the moisture that is removed from the film.

The great advantage of the mentioned coating is that the heaters 16, 17 and 20, 21 serve also for the drying of said coated layers so that in fact a very compact coating/drying installation is obtained.

The mentioned installation may be used for coating a one-layer subbing coat onto a film support, but said installation may be used also for applying one, preferably the first, of a two-layer subbing coat to the film.

Examples of one-layer subbing coatings can be found in Swiss CH Pat. No. 558,551 filed Feb. 5, 1971 by Imperial Chemical Industries, U.S. Pat. No. 3,501,301 of Gale F. Nadeau, Clemens B. Starck, and Frederick J. Jacoby issued Mar. 17, 1970, U.S. Pat. No. 4,123,278 of August J. Van Paesschen and Lucien J. Van Gossum issued Oct. 31, 1978 and GB Pat. No. 1,421,758 filed May 26, 1972 by Agfa-Gevaert N. V.

Examples of two-layer subbing coatings may be found in U.S. Pat. No. 2,627,088 of Francis Peter Alles and William Russell Saner issued Feb. 3, 1953, U.S. Pat. No. 2,698,235 of Frank E. Swindells issued Dec. 28, 1954, GB Pat. No. 1,234,755 filed Sept. 28, 1967 by Gevaert-Agfa N. V. and GB Pat. No. 1,441,591 filed July 17, 1972 by Agfa-Gevaert N. V. From the two-layer coating compositions, the first polymer layer which is usually a chlorine-containing vinyl copolymer layer as described in the foregoing patents or a copolyester dispersion as described in German Pat. (DE-OS) No. 2,813,014 filed Mar. 23, 1978 by Bexford is coated by the coaters 115 and 116 and dried by the heaters 16, 17. Thereafter, and preferably at a location situated between the longitudinal stretcher and the transverse stretcher 82, the second gelatin-containing layer e.g. of the type described in the foregoing references is coated by a suitable coating system followed by a conventional drying installation to dry the film before it is introduced into the transverse stretcher 82.

The advantages of such subbing coatings are outstanding. The two layers on each side of the film are coated to a reduced width since the film has not yet been transversely stretched. The coating of the first layers occurs at a reduced film speed since the film has not yet been longitudinally stretched. Thereby it is possible to use uncomplicated coating systems, for example roller or dip coaters, as distinct from modern coaters such as extrusion or cascade coaters that are required for coating speeds in excess of 30 m.min$^{-1}$. The coating of the first layers requires no extra provision for a drying installation. Finally, as mentioned already in Example 2, the adhesion of a subbing layer to the film support is better than if said subbing layer, and in particular the first of them in case composite subbing layers are used, were coated after the longitudinal stretching of the film.

It will be understood that the invention is not limited to the described embodiments.

The establishing of a tensioning force acting longitudinally of the film may occur by means of a so-called vacuum-roller at the entrance and at the exit of the stretching station, rather than by the series of rollers 10 to 15 as shown in FIG. 1. A vacuum roller comprises a perforated mantle covered with an air-pervious fabric, such as felt, which mantle is rotatable about a fixed core portion that has an angular section in which an underpressure is maintained. If the film is conveyed about said roller for angular contact with the zone of underpressure, then such roller may impart a considerable tensioning force to the film.

The coating system for the application of a layer or layers to the longitudinally tensioned film, may be simpler than the arrangement of two roller coaters described hereinbefore. For instance, good results have been obtained by applying the coating compositions to the film by means of two strips of fabric that were urged under a slight pressure against both sides of the film, and that were soaked with coating composition from a suitable tray.

The coating of a subbing layer simultaneously on both sides of the film may occur in a most simple way if the coating composition for said layers is used as the cooling liquid. Thus, the water bath of the cooling station 22 in FIG. 1 may be replaced by a bath of coating solution. The system of coating thus obtained is basically a dip-coating system and in addition to the advantage of simplicity, it has the advantage of applying the coating before the film has been completely longitudinally stretched since the longitudinal stretching continues partly in the cooling station. The adhesion of a subbing layer applied in the described way will consequently be better than if said layer were applied after the longitudinal stretching of the film.

We claim:

1. A process of longitudinally stretching a substantially amorphous polyethylene terephthalate film during its longitudinal conveyance in which longitudinal stretching forces are applied to the film by first and second traction means located at spaced positions along the path of conveyance of the film, while heating the film between said first and second traction means by means of infrared radiation to a temperature such that the film undergoes plastic elongation under said stretching forces, and then cooling the stretched film, characterised by the steps of maintaining the temperature of the first traction means not higher than 65° C., carrying out said heating by directly and symmetrically exposing both sides of the film first to diffused IR-radiation to increase the film temperature but not sufficient for plastic elongation to occur, thereby preheating the film, and then to concentrated infrared radiation to heat the film to a temperature between 100° and 120° C. whereby rapid plastic elongation of the film occurs under said stretching forces, and then rapidly cooling the film to below its second order transition temperature, before it reaches the second traction means, by bringing the two sides of the film symmetrically into contact with a cooling liquid.

2. Method according to claim 1, wherein the temperature to which the film is heated by the concentrated radiation is between 105° and 115° C.

3. Method according to claim 1, wherein the temperature of said first traction means is maintained lower than 55° C.

4. Method according to claim 3, wherein the temperature of said first traction means is maintained between 20° and 40° C.

5. Method according to claim 1, wherein the cooling takes place by immersion of the film in a bath of cooling liquid which is continuously renewed at the region where the film enters the bath, and wherein the liquid surface at that region is kept quiescent.

6. Method according to claim 1, wherein the exposure of the film to said concentrated IR-radiation occurs over a zone that extends transversely of the film, and that has a length not greater than 100 mm.

7. Method according to claim 6, wherein said zone has a length from 1.0 to 5.0 mm.

8. Method according to claim 1, wherein the film is preheated to a temperature in the range of 75° to 80° C.

9. Method according to claim 1, wherein the film is preheated by convection with heated air, in addition to the heating by infrared radiation.

10. Method according to claim 1, wherein a subbing layer that is non-soluble in the cooling liquid is coated on at least one side of the film while the film is subjected to said longitudinal tensioning force and before the film is preheated, and wherein the preheating is carried out to dry said subbing layer before said layer enters in contact with the cooling liquid.

11. Method according to claim 1, wherein said cooling liquid is a coating composition for forming a layer on the film when dried.

12. Method according to claim 1, wherein the average temperature gradient through the film, caused by the contact with the first traction means is smaller than 0.2° C. per 0.1 mm of film thickness.

13. Apparatus for longitudinally stretching a substantially amorphous polyethylene terephthalate film comprising:
   first driven roller means for feeding said film at a first speed in a zone where the film is freely supported,
   means for maintaining the temperature of said first roller means lower than 65° C.,
   second driven roller means for removing the cooled film from said zone at a second speed that is higher than said first speed to cause the film to be stretched in said zone,
   first IR-heaters disposed symmetrically at both sides of the film path through said zone for producing IR-radiation thereby to heat the film to a temperature at which it does not yet become stretched,
   second IR-heaters disposed transversely and symmetrically at both sides of the film path, for heating the film to a temperature between 100° and 120° C. to effect stretching thereof,
   a bath of cooling liquid into which the stretched film is immersed,
   means in said bath for keeping the free surface of said cooling liquid at the entry region of the film quiescent, and
   roller means disposed below the level of the cooling liquid in said bath for terminating the zone where the film is free supported.

14. Apparatus according to claim 13 comprising means for adjusting the position of said second IR-heaters so that a transverse line on which the film is heated to the stretching temperature may be adjusted between the exit end of said second IR-heaters and the level of the cooling liquid in said bath.

15. Apparatus according to claim 12, wherein said roller means disposed below the level of the cooling liquid in said bath are freely rotatable.

16. Apparatus according to claim 13, wherein the friction coefficient of the roller means disposed below the level of the cooling liquid is such that the friction between the film and said roller means disposed below the level of the cooling liquid, equals the friction between the film and the first driven roller means.

17. Apparatus according to claim 13, wherein said roller means for pulling the film is separated from the exit of the film from the cooling bath and wherein drier means is provided for drying the film over the distance between the exit of the film from the bath and the first contact of the film with the roller means.

18. Apparatus according to claim 13, wherein said bath with cooling liquid has an open top side, and wherein the level of the liquid in said bath is determined by at least one overflow edge that runs parallel to the plane of the film entering the liquid.

19. Apparatus according to claim 18, wherein there are two parallel overflow edges situated at either side of the entry plane of the film into the liquid, and wherein said overflow edges have a saw-tooth profile.

20. Apparatus according to claim 19, wherein the cooling liquid is pumped into said bath at such a rate that the level of the liquid in the entry zone of the bath between the two parallel overflow edges is situated in area of the upper half of the height of the teeth of the overflow edges.

21. Apparatus according to claim 20, wherein the height of said cooling liquid in said bath coincides with the tops of the teeth of the overflow edges.

22. Apparatus according to claim 13, wherein each said second IR-heater comprises at least one rodlike IR-lamp mounted in one focus of a half-elipsoidal reflector.

23. Apparatus according to claim 13, wherein said first IR-heaters are mounted within an IR-reflecting casing at either side of the film path, each casing being cooled by a forced current of air and directing at least a portion of the air which has been heated by convection of the IR-heaters, against both sides of the film.

24. Apparatus according to claim 13, comprising coating means for applying a subbing layer to at least one side of the film at a position situated between the first driven roller means and the first IR-heaters.

* * * * *